US012026802B2

(12) United States Patent
Yoon et al.

(10) Patent No.: US 12,026,802 B2
(45) Date of Patent: Jul. 2, 2024

(54) SHARING OF RESOURCES FOR GENERATING AUGMENTED REALITY EFFECTS

(71) Applicant: Meta Platforms Technologies, LLC, Menlo Park, CA (US)

(72) Inventors: Kyle Sejin Yoon, San Francisco, CA (US); Alex Garcia Goncalves, Santa Clara, CA (US); Jonathan Lim, Oakland, CA (US); Yuanshuo Lu, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 217 days.

(21) Appl. No.: 17/592,052

(22) Filed: Feb. 3, 2022

(65) Prior Publication Data

US 2022/0156984 A1    May 19, 2022

Related U.S. Application Data

(63) Continuation of application No. 16/912,585, filed on Jun. 25, 2020, now Pat. No. 11,276,206.

(51) Int. Cl.
*G06T 11/00* (2006.01)
*G06T 1/20* (2006.01)
(Continued)

(52) U.S. Cl.
CPC ............... *G06T 11/00* (2013.01); *G06T 1/20* (2013.01); *G06T 1/60* (2013.01); *G10L 15/22* (2013.01); *G10L 2015/223* (2013.01)

(58) Field of Classification Search
None
See application file for complete search history.

(56) References Cited

U.S. PATENT DOCUMENTS 5,867,166 A    2/1999  Myhrvold et al.
6,275,983 B1   8/2001  Orton et al.
(Continued)

FOREIGN PATENT DOCUMENTS

| CN | 102197374 B | 4/2014 |
| CN | 103890721 B | 7/2017 |

(Continued)

OTHER PUBLICATIONS

Czylewski A., et al., "Multimodal Human-computer Interfaces Based on Advanced Video and Audio Analysis," 6th International Conference on Human System Interactions (HSI), IEEEXplore, Jun. 6-8, 2013, pp. 18-25.

(Continued)

*Primary Examiner* — Patrick F Valdez
(74) *Attorney, Agent, or Firm* — Potomac Law Group, PLLC; Dannon G. Allbee

(57) ABSTRACT

An augmented reality (AR) effect system can improve application of AR effects by sharing resources between AR effects. The AR effect system can employ manifests for AR effects that define which resources are required to render each AR effect. The AR effect system can organize rendering operations used by selected AR effects into a pipeline and can use the manifests of the AR effects to determine when each resource will be needed. Based on this pipeline, the AR effect system can create a cache order defining a resource schedule which specifies, when a resource is freed, conditions for whether to save the resource to a local cache or unload the resource. As rendering of the video with the AR effects progresses, the resource schedule can control whether resources not currently being used to render an AR effect should be unloaded or cached for fast access for future render operations.

19 Claims, 13 Drawing Sheets

(51) Int. Cl.
*G06T 1/60* (2006.01)
*G10L 15/22* (2006.01)

(56) References Cited

U.S. PATENT DOCUMENTS

| | | |
|---|---|---|
| 7,161,599 B2 | 1/2007 | Beda et al. |
| 7,548,237 B2 | 6/2009 | David et al. |
| 8,448,067 B2 | 5/2013 | Cerny et al. |
| 9,035,947 B2 | 5/2015 | Jensen et al. |
| 9,396,001 B2 | 7/2016 | Amendolagine |
| 9,514,242 B2 | 12/2016 | Jooste |
| 9,514,573 B2 | 12/2016 | Grimaud |
| 9,600,595 B2 | 3/2017 | DeLuca et al. |
| 9,678,616 B2 | 6/2017 | Cerny et al. |
| 10,447,744 B2 | 10/2019 | Feldman et al. |
| 10,452,359 B2 | 10/2019 | Valtchev |
| 10,706,212 B1 | 7/2020 | Righetto et al. |
| 11,024,101 B1 | 6/2021 | Chepizhenko et al. |
| 2004/0078618 A1 | 4/2004 | Moser et al. |
| 2008/0222618 A1 | 9/2008 | Valtchev |
| 2009/0158315 A1 | 6/2009 | Bendall et al. |
| 2009/0237418 A1 | 9/2009 | Nave et al. |
| 2010/0077058 A1 | 3/2010 | Messer |
| 2012/0117508 A1 | 5/2012 | Amendolagine |
| 2013/0207981 A1 | 8/2013 | Quirk |
| 2013/0222397 A1 | 8/2013 | Master et al. |
| 2014/0033091 A1 | 1/2014 | Schein et al. |
| 2014/0047413 A1 | 2/2014 | Sheive et al. |
| 2014/0092135 A1 | 4/2014 | McArdle et al. |
| 2014/0344806 A1 | 11/2014 | Suresh et al. |
| 2015/0009222 A1 | 1/2015 | Diard et al. |
| 2015/0243085 A1 | 8/2015 | Newhouse et al. |
| 2015/0269785 A1 | 9/2015 | Bell et al. |
| 2015/0339038 A1 | 11/2015 | Illobre et al. |
| 2015/0350737 A1 | 12/2015 | Anderson et al. |
| 2016/0048398 A1 | 2/2016 | Taylor et al. |
| 2016/0092083 A1 | 3/2016 | Korkus et al. |
| 2016/0156943 A1 | 6/2016 | Hattori et al. |
| 2016/0189685 A1 | 6/2016 | Ryan |
| 2016/0291814 A1 | 10/2016 | Pigat et al. |
| 2017/0316539 A1 | 11/2017 | Du et al. |
| 2017/0329514 A1 | 11/2017 | McCarthy et al. |
| 2018/0190020 A1* | 7/2018 | Mullins ............... G06N 7/01 |
| 2018/0302630 A1* | 10/2018 | Copley ............... H04N 19/172 |
| 2019/0335166 A1* | 10/2019 | Copley ............... H04N 13/167 |
| 2019/0347865 A1 | 11/2019 | Hackett et al. |
| 2020/0167995 A1 | 5/2020 | Hare et al. |
| 2020/0250879 A1 | 8/2020 | Foster et al. |
| 2020/0302699 A1 | 9/2020 | Cantor et al. |
| 2020/0372715 A1 | 11/2020 | Sawhney et al. |
| 2020/0410763 A1 | 12/2020 | Hare et al. |
| 2021/0314670 A1* | 10/2021 | Atluru ............... H04N 21/4318 |

FOREIGN PATENT DOCUMENTS

| | | |
|---|---|---|
| CN | 104915200 B | 4/2018 |
| WO | 2017125561 A1 | 7/2017 |

OTHER PUBLICATIONS

International Preliminary Report on Patentability for International Application No. PCT/EP2017/051211, dated Aug. 2, 2018, 08 Pages.

International Search Report and Written Opinion for International Application No. PCT/EP2017/051211, dated Jun. 2, 2017, 08 Pages.

Lindblad C.J., et al., "The VuSystem: A Programming System for Visual Processing of Digital Video," Proceedings of the second Association for Computing Machinery international conference on Multimedia, Oct. 1994, pp. 307-314.

Scheifler R.W., et al., "The X Window System," ACM Transactions on Graphics, Apr. 1986, vol. 5 (2), pp. 79-109, XP000565891, ISSN: 0730-0301. DOI: 10.1145/22949.24053.

Schroeter J.P., "SUPRIM: Easily Modified Image Processing Software," Journal of Structural Biology, Jan.-Feb. 1996, vol. 116 (1), Article No. 0021, pp. 131-137.

Stone M.C., et al., "The Movable Filter as a User Interface Tool," CHI '94: Proceedings of the SIGCHI Conference on Human factors in Computing systems, Apr. 24-28, 1994, pp. 306-312.

Eilemann S., et al., "Equalizer: A Scalable Parallel Rendering Framework," IEEE Transactions on Visualization and Computer Graphics, May-Jun. 2009, vol. 15, No. 3, pp. 436-452.

Jang S M., et al., "Client Rendering Method for Desktop Virtualization Services," ETRI Journal, Apr. 1, 2013, vol. 35, No. 2, pp. 348-351.

Paradis D.J., et al., "Remote Rendering and Rendering in Virtual Machines," 2016 International Conference on Computational Science and Computational Intelligence (CSCI), Dec. 15-17, 2016, pp. 218-221.

Shi W., et al., "Scalable Support for 3D Graphics Applications in Cloud," 2010 IEEE 3rd International Conference on Cloud Computing, Jul. 5-10, 2010, pp. 346-353.

Zhao H., et al., "Fully Automatic Wrapper Generation for Search Engines," Proceedings of the 14th International Conference on World Wide Web, May 10, 2005, pp. 66-75.

* cited by examiner

SHARING OF RESOURCES FOR GENERATING AUGMENTED REALITY EFFECTS

CROSS-REFERENCE TO RELATED APPLICATIONS

This patent application is a continuation of U.S. patent application Ser. No. 16/912,585 filed Jun. 25, 2020, currently pending and which is incorporated herein by reference in its entirety.

TECHNICAL FIELD

The present disclosure is directed to improving application of augmented reality (AR) effects to video by sharing resources between AR effect render operations.

BACKGROUND

People are capturing, sharing, and viewing videos at an incredible rate. According to one estimate, one large social media website facilitates around four billion video viewing events each day. With this ever-increasing demand, users want the ability to customize such videos e.g., with filters, captions, overlays, and other effects. The enhancement of a video with computer-generated perceptual information in various modalities such as visual, auditory, haptic, etc., is referred to as applying augmented reality (AR) effects.

In some cases, visual AR effects can be "view locked," where aspects of the effect are positioned relative to the dimensions of a video frame and may move but without relation to the content of the video. An example of a view locked AR effect is a logo placed in the bottom-right corner of the video, no matter how the camera moves. In other cases, visual AR effects can be "world locked" where the effect is positioned relative to video content, such as a particular displayed person or object, even when the camera view shifts. An example of a world locked AR effect is a crown placed on a depicted user's head that appears to remain in the same position on the user's head as the camera moves. AR effects can also be "non-reactive" (i.e., have a pre-defined output irrespective of the video content), or "reactive" (i.e., the effect can present differently depending on video content, such as specified triggers the system can identify). An example of a non-reactive AR effect is a spaceship flying around the video frame which doesn't change as the video content changes. An example of a reactive AR effect is that same spaceship, but it moves to avoid a depicted user's hands and appears to explode if a user's hand intersects with it. AR effects can have many other characteristics, which can rely on a variety of subsystems such as machine learning models, 3D modeling, hand tracking, object recognition, target tracking, location services, audio graphing, etc.

While existing systems can apply AR effects to live or previously captured videos, they tend to limit the total number and timing of applied AR effects.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
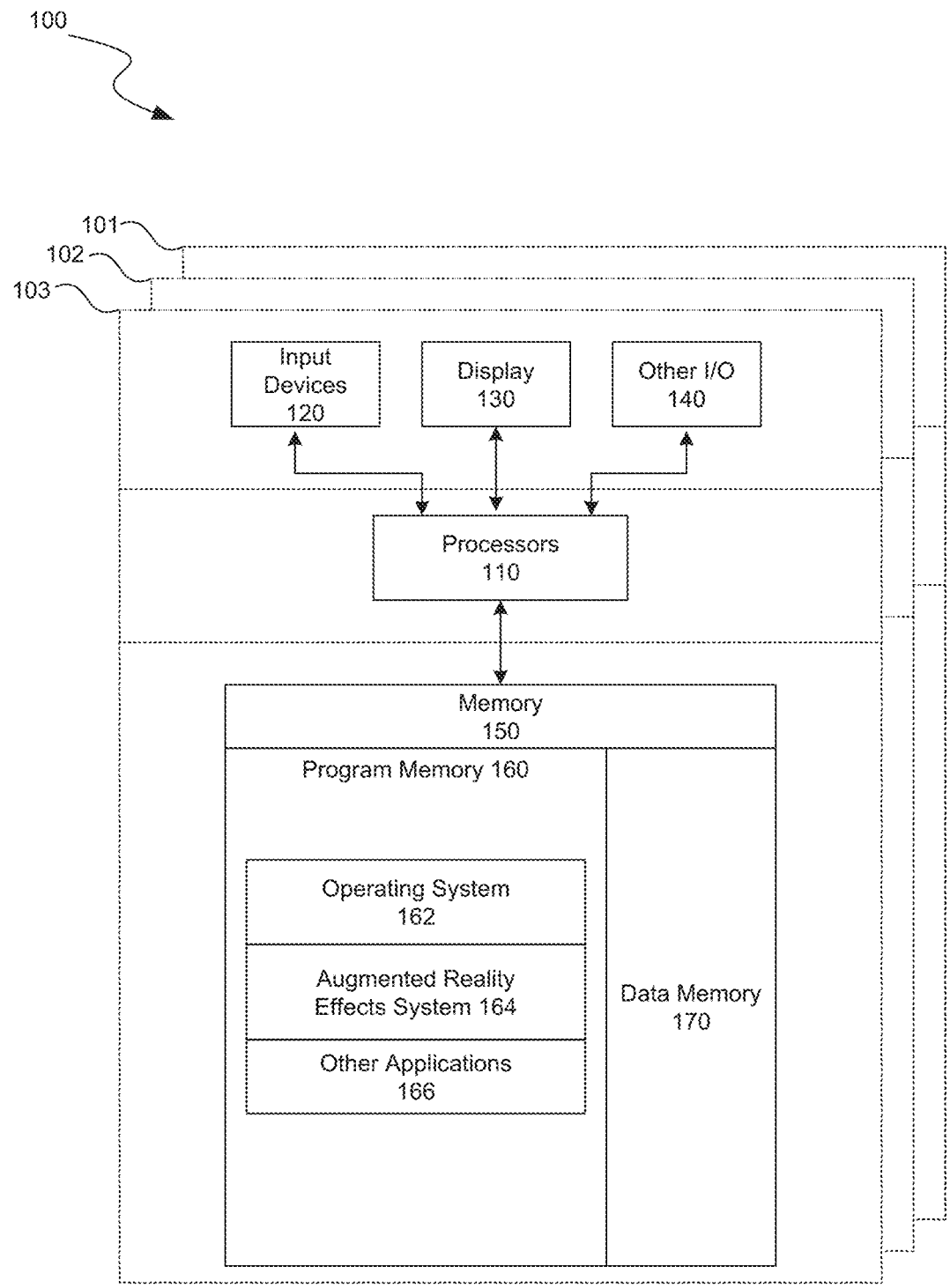
FIG. 1 is a block diagram illustrating an overview of devices on which some implementations of the present technology can operate.

Aspects of the present disclosure are directed to improving application of AR effects by sharing resources between AR effect render operations, which allows numerous, overlapping AR effects to be applied to the same video. AR effect systems that can achieve these improvements can include user interfaces and processes to interpret user interactions when applying AR effects. Such features can include, for example, interfaces for selecting AR effects, setting corresponding implementation parameters such as start and stop timing or other conditions or aspects of a video (e.g., area, objects, people, etc.), or voice controls for activating AR effects or otherwise controlling associated video capture. Additional details on user interfaces, including voice controls, and associated processes to interpret user interactions for applying AR effects are discussed below in relation to FIGS. 5 and 6.

The AR effect system can include processes for rendering the selected AR effects into a recorded video while sharing resources between the AR effect render operations. The AR effect system can accomplish this by employing manifests for AR effects that define which resources are required to render each AR effect. The AR effect system can determine rendering operations associated with each AR effect selected for a video. The AR effect system can organize these rendering operations into a pipeline and can use the manifests of the AR effects to determine when, in the rendering process, each resource will be needed. Based on this pipeline, the AR effect system can create a cache order defining a resource schedule. When an AR effect is ended or the rendering of the AR effect no longer needs a resource, the resource schedule can specify conditions to evaluate to determine whether to save the resource to a local cache or unload the resource. As used herein, a "cache" can be any type of storage, such as flash memory, RAM, registers, etc. A cache may be local storage and may be a faster type of memory than a hard drive. In some cases, the cache may be in a hard drive or other local storage, e.g., where a resource is retrieved from a remote source and stored locally. As rendering of the video with the AR effects progresses, the AR effect system can use the resource schedule to determine whether freed resources should be unloaded or cached for fast access for future render operations.

The resource schedule can specify when to unload resources depending on whether the resource will be needed again, as indicated by the pipeline. In some cases, the resource schedule can further be based on a prediction or resource score, which the AR effect system can compute based on factors such as the time required to reload the resource (e.g. based on the resource size, latency in connecting with a data store housing the resource, steps required to initialize the resource, etc.), how often the resource is used in the pipeline, when it will next be used in the pipeline, etc. In some implementations, whether the resource is retained can further be based on availability in the cache for storing resources. Additional details on creating a cache order defining a resource schedule and using it to determine whether to retain or unload freed resources are discussed below in relation to FIG. 7.

In some implementations, the AR effect system can predictively load resources used in rendering AR effects. The AR effect system may predictively pre-load resources prior to initiating video rendering based on factors such as AR effect use statistics, user history, video capture location, etc. The AR effect system can also, or alternatively, predictively retain resources loaded for selected AR effects as video rendering progresses, which can be based on the same factors as well as identified content of the video. Predictive pre-loading or retaining of resources allows some resources to be locally available, avoiding the need to perform expensive loading procedures during rendering. Predictive resource caching can be based on a resource score, with factors determined based on predicted resource use instead of resource use or resource characteristics that affect load time. Additional details on predictively loading and retaining resources are discussed below in relation to FIG. 8.

Embodiments of the disclosed technology may include or be implemented in conjunction with a traditional computing system or an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

There are existing systems that apply AR effects to videos. However, these systems often limit the number of AR effects that can be applied, restrict timing for which they can be applied (e.g., how many can overlap on video frames), are inefficient in rendering AR effects into videos, and can be difficult to control. The AR effect system and processes described herein are expected to overcome these problems of existing systems and are expected to provide the ability to apply more AR effects to videos with fewer restrictions while decreasing rendering times. Thus, the AR effect system disclosed herein can apply AR effects to any duration of a video, with different start times, and with multiple effects applied simultaneously. Further, the present AR effect system can provide these benefits with greater user control through voice commands to control AR effect application. To apply effects in this manner, the disclosed AR effect system can predictively pre-load resources for rending the AR effects and/or can share resources between AR effects by retaining them either predictively or based on a determined resource schedule for AR effect rendering operations.

Several implementations are discussed below in more detail in reference to the figures. FIG. 1 is a block diagram illustrating an overview of devices on which some implementations of the disclosed technology can operate. The devices can comprise hardware components of a computing system 100 that allow users to select AR effects, predictively load and/or retain resources for rendering AR effects into videos, and share resources between AR effects when rendering. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, AR effect system 164, and other application programs 166. Memory 150 can also include data memory 170 storing that can include videos, AR effect configurations and manifests, mappings of AR effects to voice commands, AR effect lists selected for videos, AR effect statistics, user histories, active AR effect data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
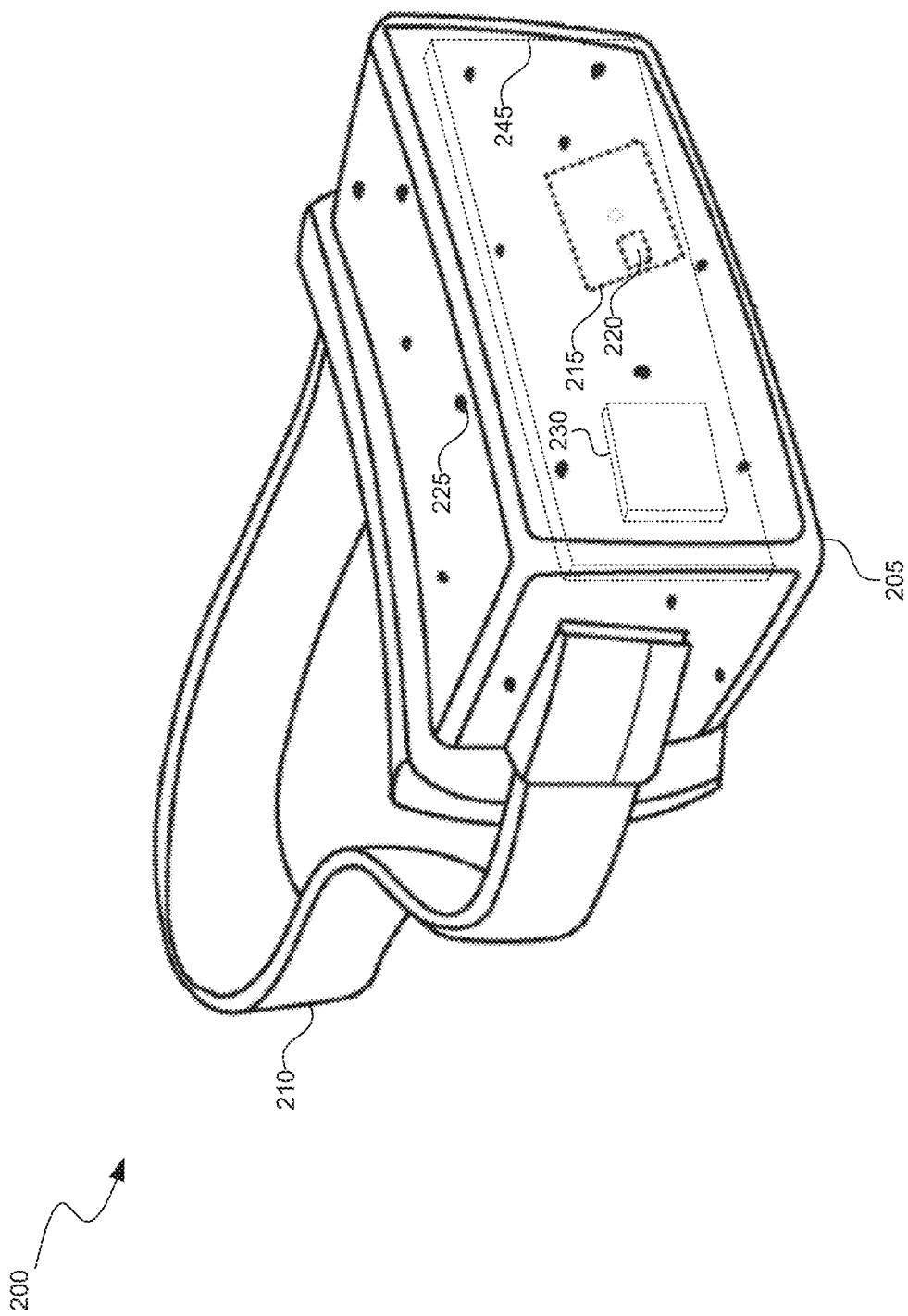
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3 DoF) or six degrees of freedom (6 DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
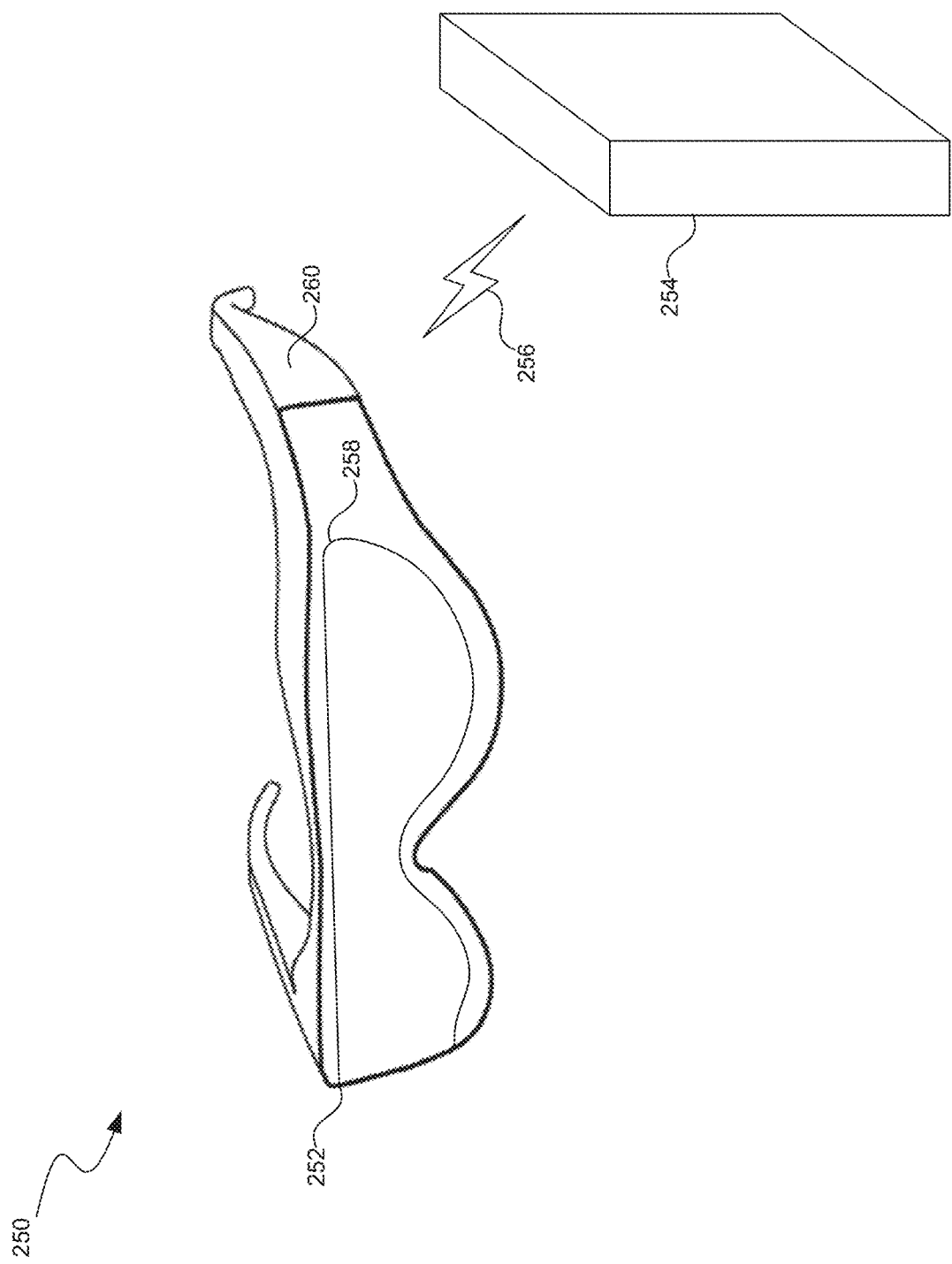
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3 DoF or 6 DoF, track portions of the user (e.g., hands, feet, head, or other body parts), map virtual objects to appear as stationary as the HMD 252 moves, and have virtual objects react to gestures and other real-world objects.

Figure 3:
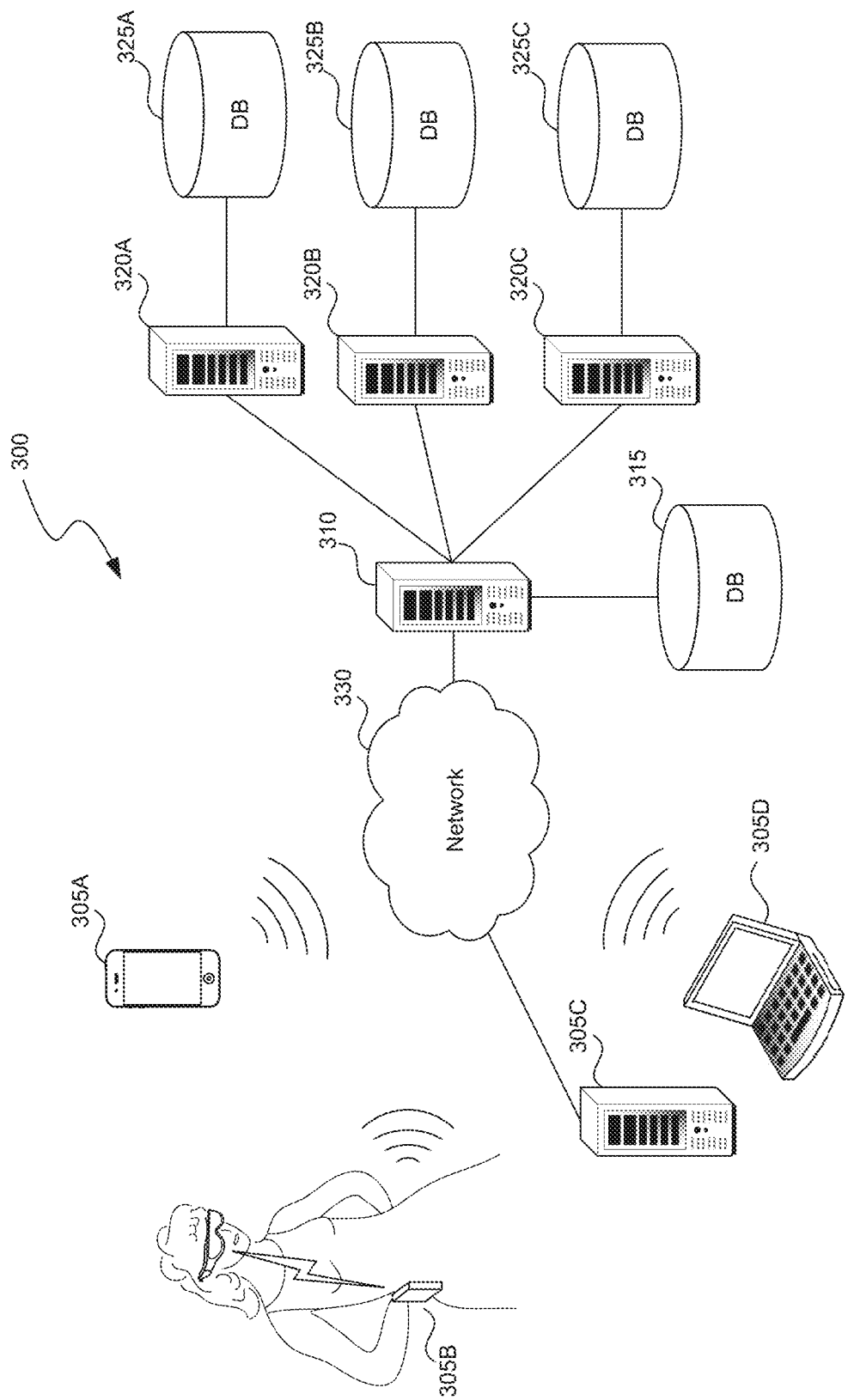
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
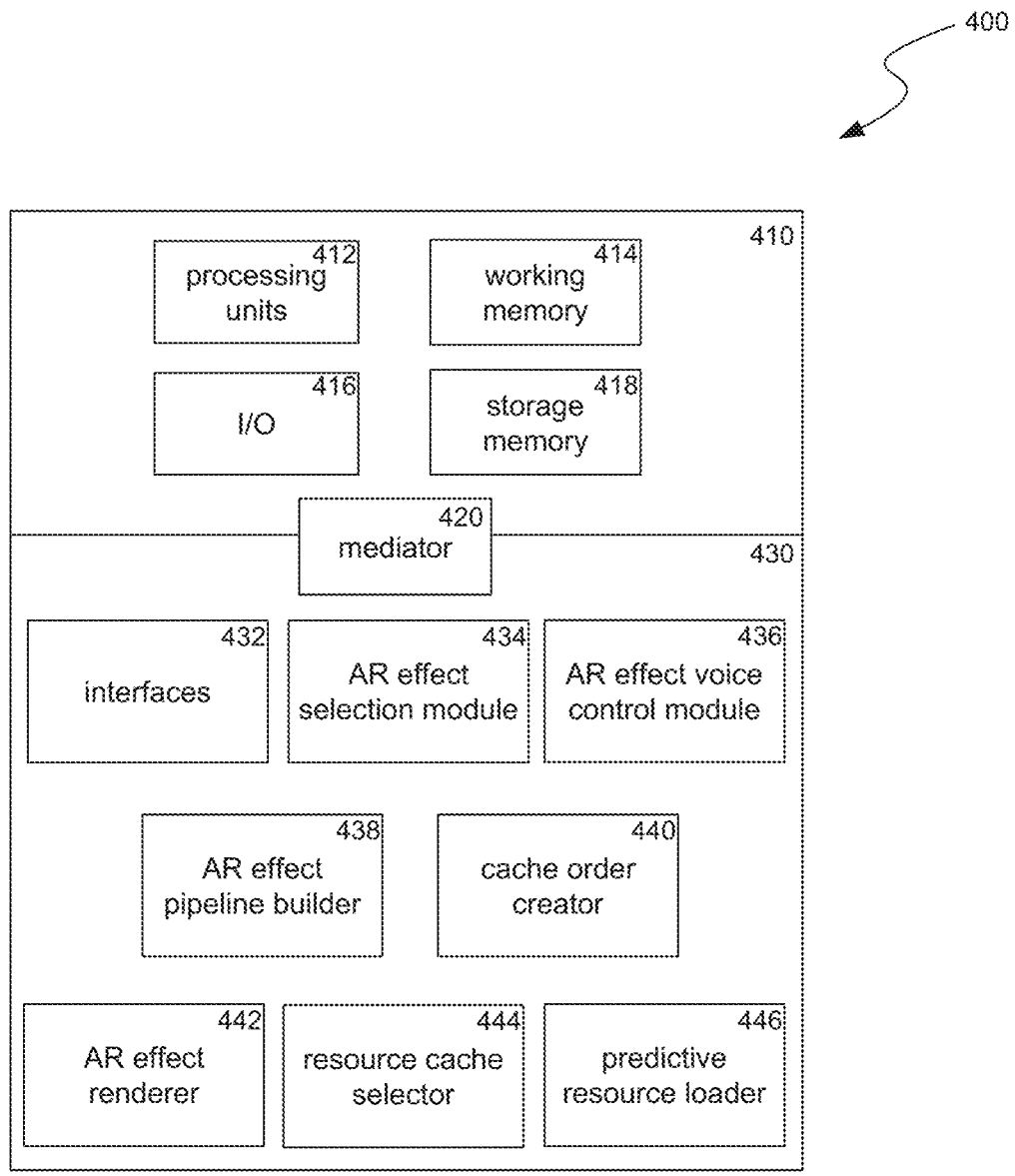
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to facilitate user selection of AR effects, predictively load and/or retain resources for rendering AR effects into videos, and share resources between AR effects when rendering. Specialized components 430 can include AR effect selection module 434, AR effect voice control module 436, AR effect pipeline builder 438, cache order creator 440, AR effect renderer 442, resource cache selector 444, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code portions of one or more applications.

AR effect selection module 434 can provide interfaces for a user to select AR effects for a video. These interfaces can include interfaces with physical buttons (of I/O 416), UI elements, gesture recognition, or voice recognition (using AR effect voice control module 436). The AR effect selection module 434 can receive AR effect selections along with implementation parameters, such as timeframes for applying the AR effects, triggers for activating the AR effects, size and positions of the AR effects, etc. The AR effect selection module 434 can store the selected AR effects and corresponding implementation parameters in association with the video they are applied to. Additional details on AR effect selection are provided below in relation to FIG. 5.

AR effect voice control module 436 can determine when voice commands are active (e.g., when an activation key phrase is spoken), convert a voice command to text, match the voice command to an AR effect using a previously established mapping of commands to AR effects, and provide the selected AR effect. Additional details on AR effect selection using voice controls are provided below in relation to FIG. 6.

AR effect pipeline builder 438 can receive a set of AR effects for a video (as selected and stored using AR effect selection module 434) and, using manifests specifying the resources used by render operations for the AR effects, generate a pipeline of the render operations. AR effect pipeline builder 438 can build the pipeline based on when the AR effects are scheduled to be in the video and the dependencies of resources between those render operations. Additional details on building a pipeline of render operations for a set of AR effects are provided below in relation to block 708 of FIG. 7.

Cache order creator 440 can determine potential cache orders, based on a pipeline received from AR effect pipeline builder 438, by allocating different times at which resources can be loaded, saved to a cache, and/or unloaded. Cache order creator 440 can then select the potential cache order with the lowest total load cost, which can specify a schedule for loading, unloading, and/or caching resources. Additional details on selecting a cache order with a resource schedule are provided below in relation to block 710 of FIG. 7 and FIG. 9.

AR effect renderer 442 can render AR effects into frames of a video according to the AR effects selected with AR effect selection module 434. This can include executing the render operations for the AR effects defined in the render operation pipeline created by AR effect pipeline builder 438. In some implementations, rendering AR effects into a video can include executing existing rendering procedures for AR effects. Additional details on rendering AR effects into a video are provided below in relation to blocks 712-716 of FIG. 7 and FIGS. 10A-10C.

Resource cache selector 444 can identify when resources have been freed (e.g., are not being used by any current render operations) and, based on the resource schedule from cache order creator 440, can determine when freed resources should either be stored in a local cache (which may be part of working memory 414 or storage memory 418) or unloaded. Additional details on adding resources to a cache and unloading resources are provided below in relation to blocks 718-723 of FIG. 7.

Predictive cache loader 446 can predictively select resources to either pre-load before a video is received or predictively retain in a cache after a resource has been freed upon completion of a render operation. Resources can be predictively loaded or cached based on factors such as statistics on how often various AR effects are used, size and load time for resources, available cache space, user specifics (e.g., which AR effects a current user tends to select or which AR effects users with characteristics similar to a current user tend to select), which AR effects tend to be selected by users for videos depicting or captured at certain locations, which AR effects tend to be selected by users for videos depicting certain topics or objects, etc. Additional details on predictively loading and caching resources are provided below in relation to FIG. 8.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
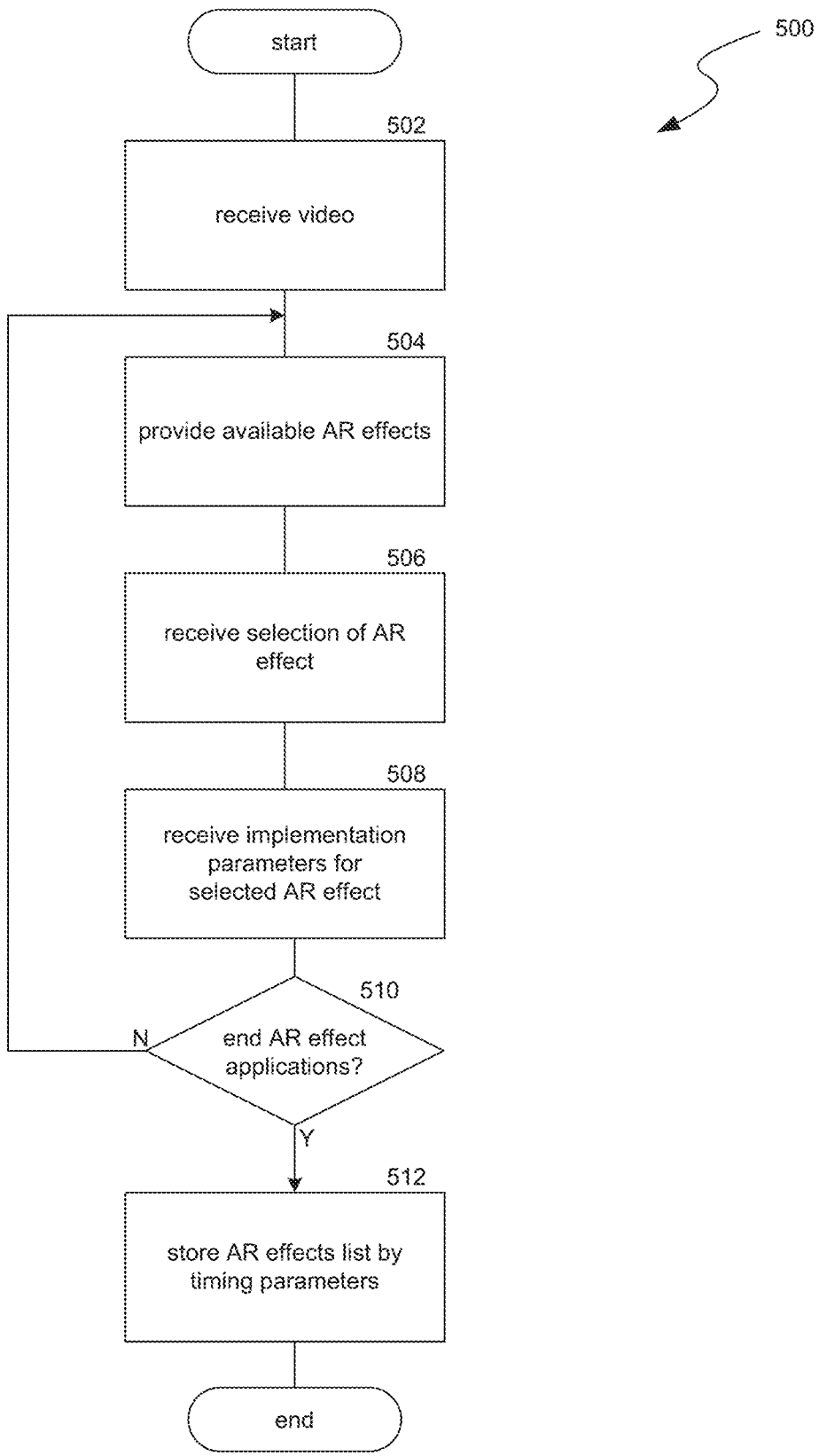
FIG. 5 is a flow diagram illustrating a process used in some implementations of the present technology for interpreting user interactions to apply AR effects.

FIG. 5 is a flow diagram illustrating a process 500 used in some implementations of the present technology for interpreting user interactions to apply AR effects. In some implementations, process 500 can be performed as a video is recorded to select AR effects to apply to a live stream of a video or can be performed in relation to a previously recorded video to select AR effects to apply in post-capture rendering. In various implementations, process 500 can be performed locally on a mobile device or personal computer or can be performed on a server system, e.g., through video and controls provided by a user at a remote system. In some cases, process 500 can be performed automatically, e.g., as a result of a user beginning to capture video via a camera application or saving a video file or can be performed as a result of a user activating a control, such as by turning on an AR effect feature or opening a video editing program.

At block 502, process 500 can receive video data. This can be a part of a video that is currently being captured or a previously captured video that a user has selected for augmenting with AR effects.

At block 504, process 500 can make available AR effects that can be added to the received video. In some implementations, the available AR effects are any loaded into the system. In other implementations, AR effects can have constraints on whether they can be applied, such as only when certain objects are identified in the video (e.g., an AR effect can only be applied to a person's face and so is only enabled when a face is depicted), can only be applied to videos of a certain length or encoding, can only be applied in post-capture when future frames can be analyzed, can only be applied by users with certain characteristics, can only be applied when at a particular location or when the video was captured at that location, can only be applied once paid for, etc. The available AR effects can be those whose constraints are met by the current conditions. In various implementations, providing the available AR effects can include one or more of activating corresponding controls, providing menus of available AR effects, allowing voice selection of available AR effects, allowing gesture selection of available AR effects, etc.

At block 506, process 500 can receive a user selection of an AR effect to apply to the received video. This can include receiving an activation of a physical control or graphical UI element, mapping a recognized gesture or voice command to an AR effect, etc. Additional details on voice selection of AR effects are provided below in relation to FIG. 6.

At block 508, process 500 can receive implementation parameters for the AR effect selected at block 506. Implementation parameters can include, for example, start and/or end conditions for the AR effect, such as a timeframe of the video to apply the AR effect to or an identification of an object that, when recognized in the video, triggers application of the AR effect. The implementation parameters may also include other parameters such as offsets from edges of the video frames to apply the AR effect to, identification of depicted objects to apply the AR effect to (e.g., which of multiple depicted people the AR effect should apply to), a size or orientation for applying the AR effect, conditions for triggering changes in the AR effect (e.g., specifying whether the depicted user closing her eyes or opening her mouth triggers a color change in the AR effect), etc.

In some implementations, some or all of the implementation parameters can be set to default values, which are overridden if the user supplies alternate values. For example, when applying AR effects to a previously recorded video, a selected AR effect can, by default, be applied to the whole video. As another example, where a first AR effect was previously selected and supplied an ending implementation parameter earlier than the end of the video, the beginning implementation parameter for a second AR effect can default to the ending implementation parameter of the first AR effect. As yet another example, when applying AR effects to a live video stream, a selected AR effect can, by default, be activated immediately upon selection. In some implementations, AR effects can have individual default implementation parameters, such as a default duration of three seconds or automatic application to the person most prominently featured (e.g., taking up the most area or present for the most time in the video). In some cases, when an AR effect is configured for application to a person, a default user can be selected for the AR effect based on a determined level of connection between the user making the AR effect selection and the depicted person. For example, if the user is also depicted in the video, they can be selected; if the user is not depicted, a depicted person determined, based on a social graph, to be most closely connected to the user can be selected, and if no person with at least a threshold level of connection to the user is depicted, a most prominently depicted person can be selected. Such user identifications can be based, e.g., on previously captured images of users, social media content associated with the users, an onboarding session that taught a machine learning model to recognize the user, etc.

At block 510, process 500 can determine whether a condition for ending AR effect selection has occurred. For example, the condition can be that the user closed an AR effect selection application, or a module within the application, or that the live video feed ended. If the ending condition exists, process 500 can continue to block 512. If not, process 500 can return to block 504 so the user can select additional AR effects.

At block 512, process 500 can store a list (or other data structure) specifying the AR effects selected in the iterations of the loop between block 504 and 510. The stored AR effects identifiers can be associated with implementation parameters. In some implementations, a stored AR effects list can be sorted by the start time implementation parameter of each AR effect, so the AR effects can easily be applied in order when the AR effects are rendered into the video. In some cases, e.g., where process 500 is performed in relation to a live video, instead of saving a list of selected AR effects, process 500 can apply the selected AR effects to the received video feed, which may include aspects of process 800, discussed below. Process 500 can end after block 512.

Figure 6:
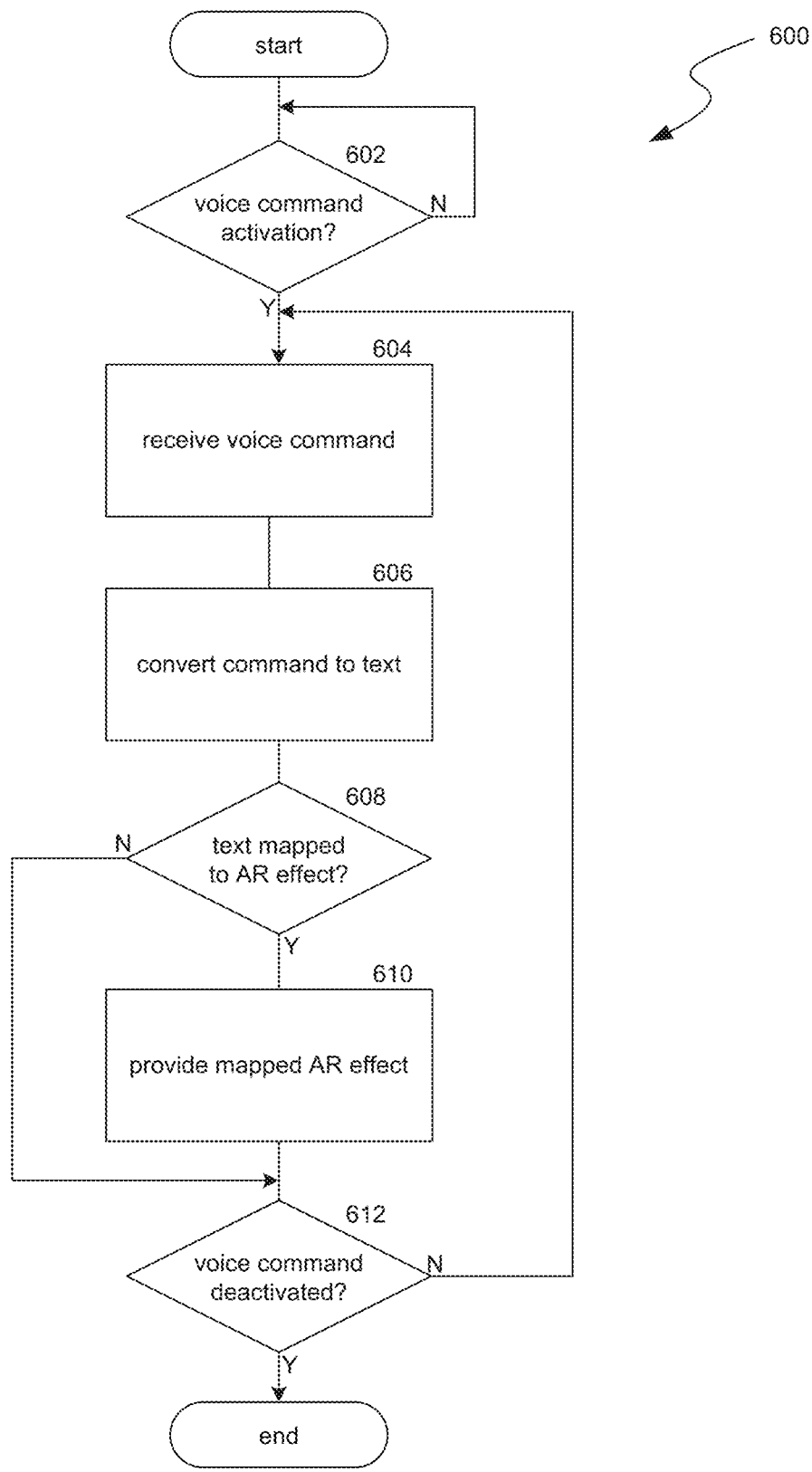
FIG. 6 is a flow diagram illustrating a process used in some implementations of the present technology for selecting one or more AR effects via voice commands.

FIG. 6 is a flow diagram illustrating a process 600 used in some implementations of the present technology for selecting one or more AR effects via voice commands. In some implementations, process 600 can be performed as a sub-process of block 506 of process 500. In other implementations, process 600 can be performed as part of an assistant application resident on a mobile device or consumer electronic device.

At block 602, process 600 can determine whether receiving voice commands is activated. In various implementations, receiving voice commands is activated upon the user saying a designated activation phrase (e.g., "Hey Samantha"), when the user presses a physical button, when the user activates a graphical user interface control, upon the system detecting a particular user gesture, etc. In some implementations, receiving voice commands is activated automatically, such as upon device startup, when video capturing starts, when an AR effect editor is opened, etc. Process 600 stays at block 602 until receiving voice commands is activated; it then proceeds to block 604.

At block 604, process 600 receives a voice command by capturing spoken words of the user. In some implementations, this can include filtering out background noise, using a directional microphone, matching input to a voice pattern, or other audio filtering and pre-processing. The received voice command can then be converted to text, at block 606, e.g., using an existing speech-to-text algorithm, such as those built on trained machine learning models.

At block 608, process 600 can determine whether the text from block 606 has been assigned to an AR effect in a previously established mapping. In various implementations, the mapping can be user defined, established by AR effect developers, and/or set by a system administrator. In some cases, determining whether the text has been mapped to an AR effect can include determining whether a subsection of the text has been mapped e.g., determining which, if any, mapping entry has the longest text portion that matches a part of the text from block 606. In various implementations, determining whether part of the text from block 606 matches a text portion of a mapping entry can include finding an exact match, finding a match excluding grammar and/or capitalization differences, or finding a semantic match. In some implementations, a semantic match can be found, for example, by determining whether phrases determined to be equivalent to the given phrase match a mapping entry. In other implementations, a semantic match can be found, for example, by having the mapping be a machine learning model that can be represented as a multi-dimensional space, and certain areas of the multi-dimensional space (each corresponding to a semantic meaning) can be mapped to a particular AR effect. If a match is found at block 608, process 600 continues to block 610; if not, process 600 continues to block 612.

At block 610, process 600 can provide an indication of the AR effect determined at block 608 to be mapped to the received voice command. In some implementations, the voice command can further include one or more implementation parameters, which process 600 can provide (e.g., to block 508) in relation to the selected AR effect.

At block 612, process 600 can determine if receiving voice commands has been deactivated. In various implementations, receiving voice commands can be deactivated after a set amount of time from when receiving voice commands was activated (e.g., four seconds after receiving the activation phrase), when capturing of a video ends, upon matching a voice command to a mapping element, upon a user command (e.g., physical button press, GUI element activation, gesture, ending voice command, etc.), upon the mobile device or consumer electronic device being turned off, upon exiting an AR effect selection application or module, etc. If receiving voice commands has not been deactivated, process 600 can return to block 604 to receive another voice command; if receiving voice commands has been deactivated, process 600 can end.

Figure 7:
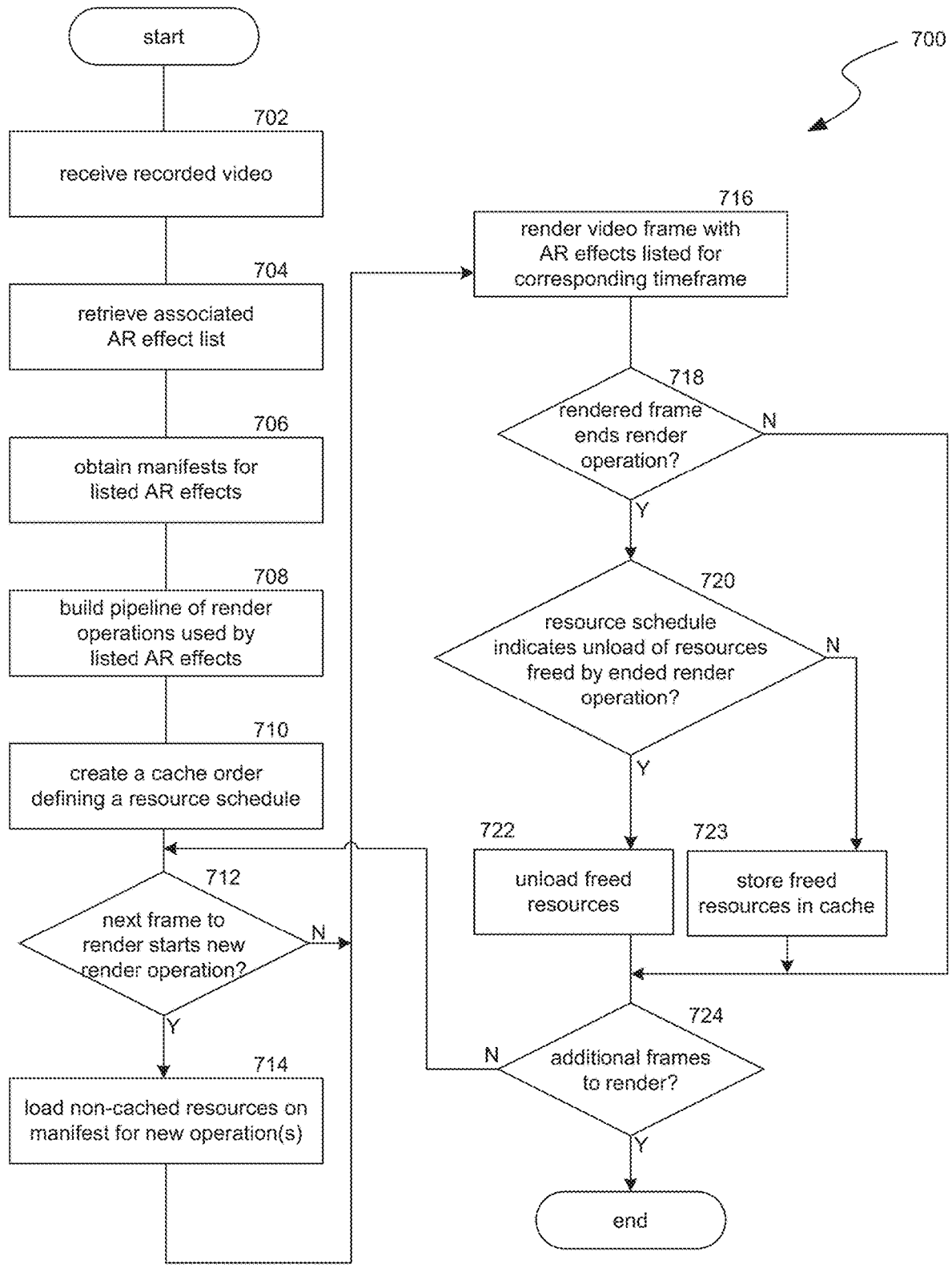
FIG. 7 is a flow diagram illustrating a process used in some implementations of the present technology for rendering multiple AR effects into a pre-recorded video with resource caching for sharing resources between AR effects.

FIG. 7 is a flow diagram illustrating a process 700 used in some implementations of the present technology for rendering multiple AR effects into a pre-recorded video with resource caching for sharing resources between AR effect rendering operations. In some implementations, process 700 can begin when a user initiates a render operation for a video after selecting AR effects to apply to the video (e.g., when process 500 ends). In various implementations, process 700 can be performed locally on a mobile device or personal computer or can be performed on a server system.

At block 702, process 700 can receive a previously recorded video. In some implementations, process 700 can be performed in context of a program such as a video editor or AR effect chooser, and the received video can be displayed in the program. For example, the program can allow a user to perform process 500 (FIG. 5), e.g., to select AR effects and implementation parameters. At block 704, process 700 can retrieve AR effects and associated implementation parameters selected for the received video. For example, this can be the AR effect list stored at block 512 of process 500.

At block 706, process 700 can obtain a manifest for each of the AR effects identified at block 704. Each manifest can specify rendering operations and/or resources needed by the rendering operations for the corresponding AR effect. Examples of resources that AR effects can require include: an audio graph, a video segmentation system (e.g., that identifies the portion of the video depicting a background or certain objects such as users, particular parts of users, flat surfaces, etc.), a gesture recognition system, camera controls, a face tracking system, a world tracking system (e.g., a simultaneous localization and mapping, "SLAM," system), a movement or target tracking system, network services, music services, location services, etc. Each of these resources can use additional resources such as machine learning models, 3D modeling systems, 2D to 3D conversion systems, etc. Manifests can be defined by AR effect creators or can be automatically generated by tracking which resources are used when rendering the AR effect.

At block 708, process 700 can build a pipeline of render operations used by the AR effects identified at block 704. This pipeline can specify timing for each rendering operation needed for the AR effects, based on the start time implementation parameter for each AR effect. In some cases, an AR effect may have a triggered start, such as when an identified object comes into view or when a depicted person performs a particular action. These triggers can be resolved into start time implementation parameters by analyzing the video to determine when the specified triggers occur. In some implementations, the pipeline can specify the various inputs needed for each render operation (e.g., resources needed—determined based on the AR effect manifests from block 706) and the output produced by each, resulting in a dependency graph of the render operations.

At block 710, process 700 can use the pipeline to create a cache order defining a resource schedule specifying when resources should be cached and/or unloaded. In some implementations, the resource schedule can specify that a resource will be loaded prior to the first instance of that resource being needed by a render operation and kept in a cache until the last render operation that uses that resource is completed. In other implementations, in addition to when the resources will be used and when they are no longer needed by any further render operations, the resource schedule can be based on additional factors such as how often a resource is used in the render operation pipeline and the time required to reload the resource (which may be based on the size of the resource and/or a latency in accessing a local or remote data store for the resource). These factors can be used to create a cache order that minimizes resource load times without overflowing the memory allocated for caching resources. For example, various possible cache orders can be analyzed to determine which one offers the minimum load time. Process 700 can accomplish this by determining a total load value used by each cache order and selecting the one with the smallest total load value. In some implementations, a threshold can specify an amount of unallocated cache memory available at a point in each potential cache order when a resource would have to be cached to ensure that at no point is a resource selected for caching that is larger than the cache memory that will be available for the entire time the resource will be cached. The resulting resource schedule can specify conditions for unloading each resource, such as specifying timing for resources to be unloaded. An example of analyzing possible cache orders to select a cache order with a smallest total load value, while not overflowing the cache memory, is provided below in relation to FIG. 9.

At block 712, process 700 can determine whether a next frame to be rendered, of the received recorded video from block 702, starts any new render operation(s). If so, process 700 continues to block 714, if not process 700 continues to block 716. At block 714, process 700 can load resources needed for the new render operation(s). If these resources are already available in a cache, process 700 can load the resources from the cache, otherwise process 700 can load the resources from a local or remote storage system.

At block 716, process 700 can render the next frame of the video with the AR effects selected for the time segment containing that video frame, as defined by the AR effect list from block 704. AR effects can be rendered into the video frames by performing the corresponding render operations from the pipeline. When the render operations for that video frame are complete, process 700 can continue to block 718.

At block 718, process 700 can determine whether the processing performed at block 716 caused any render operations to be completed or whether any resources have been otherwise freed. A freed resource is a resource that is not currently being used and therefore can be unloaded, whether or not it may be needed again (and thus reloaded) in the future. If so, process 700 can proceed to block 720; if not, process 700 can proceed to block 724. At block 720, process 700 can determine if the resource schedule from block 710 indicates whether any freed resources should be unloaded, or conversely, stored in a cache. If any resources are to be unloaded, process 700 can continue to block 722; if not, process 700 can proceed to block 723.

At block 722, process 700 can unload (e.g., remove from memory, schedule for garbage collection, etc.) any freed resources that the resource schedule indicates should be unloaded at this point. At block 723, process 700 can store any freed resources that the resource schedule indicates should be cached (which may be due to the resource schedule not indicating the resource should be unloaded).

At block 724, process 700 can determine whether there are additional frames of the video received at block 702 to render. If so, process 700 can return to block 712 to continue the rendering loop between blocks 712 and 724. If not, process 700 can provide the video, rendered with the selected AR effects, and end.

Figure 8:
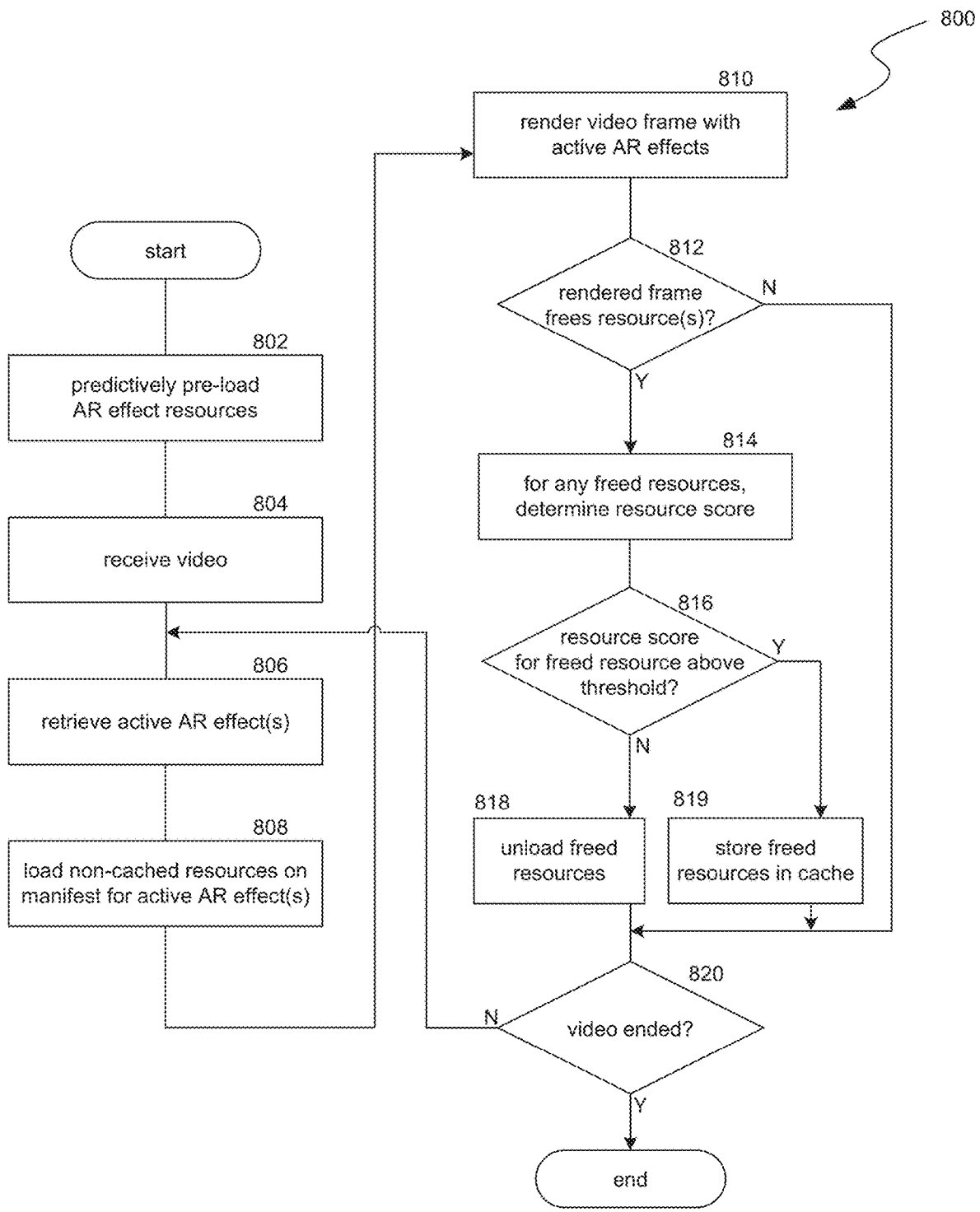
FIG. 8 is a flow diagram illustrating a process used in some implementations of the present technology for predictive resource caching.

FIG. 8 is a flow diagram illustrating a process 800 used in some implementations of the present technology for predictive resource caching for sharing between AR effects. Process 800 can begin, for example, when a rendering program is executed, when a device starts up, at a time when processing is determined to be low or at a time when processing is expected to be low. In various implementations, the remainder of process 800, beginning at block 804, can occur when a render operation occurs for a video after a user selects one or more AR effects to apply to the video (e.g., at the end of process 500) or as the user captures the video. In various implementations, process 800 can be performed locally on a mobile device or personal computer or can be performed on a server system.

At block 802, process 800 can predictively pre-load (e.g., cache) AR effect resources. Resources can be selected for pre-loading by estimating which set of pre-loaded resources will save the most loading time during the rendering of a video. This estimation can be based on AR effect statistics and/or resource characteristics. For example, AR effect statistics can specify past frequencies of AR effect usage while resource characteristics can include factors such as resource size and expected latency in accessing that resource. In some implementations, the AR effect statistics can be context specific—predicting AR effect selection based on user characteristics, location, video content, etc. As one example, the AR effect statistics can specify usage statistics for a current user, such that the system can identify which AR effects a user uses most often or in what context a user selects AR effects, and pre-load the resources for those AR effects when that context exists. As a second example, the AR effect statistics can specify usage statistics for a current location, such that the system can identify which AR effects users most often select for video captured at particular locations, and pre-load the resources when the user is at that location or there is an indication a video was captured at that location. In some implementations, selecting AR effect resources to pre-load can be accomplished using a machine learning model trained to predict which AR effects a user will select. The model can be trained on factors such as: user demographics and or biographics, user AR effect selection history, social media data, location data, etc. Resources selected for preloading can be loaded into memory (e.g., RAM, flash, etc.) from a local data store or can be retrieved from a remote data store and stored locally (e.g., in RAM, flash, a hard drive, etc.)

At block 804, process 800 can receive video. In various implementations, the received video can be pre-recorded or a live video stream. At block 806, process 800 can retrieve any active AR effects. Active AR effects are AR effects that are designated as being applied to a current frame of the received video. Where the received video is a live stream, this can be AR effects selected to be applied to the video as it is captured. Where the received video is pre-recorded, this can be AR effects selected for a current time window of the video being rendered.

At block 808, process 800 can load any resources needed for the active AR effects from block 806. This can include first retrieving any of these resources available in a local cache and loading any additional resources not available in the cache.

At block 810, process 800 can render one or more video frames applying the active AR effects. This can include executing any render operations, using the corresponding loaded resources, defined for each AR effect.

In a manner similar to block 718 described above with reference to FIG. 7, at block 812, process 800 can determine whether performing the render operations at block 810 freed any resources. If so, process 800 can continue to block 814; if not, process 800 can continue to block 820.

At block 814, process 800 can determine a resource score for any freed resources. The resource score can be a comparison (e.g., ratio) of (a) a total expected load time savings by caching the freed resource with (b) an expected cost of caching the resource freed resource. The total expected load time savings can be based on an estimated cost of reloading the freed resource and an estimated frequency of further use of the freed resource in further rendering of the video. The estimated frequency of further use of the freed resource can be a prediction made in a similar manner as was performed at block 802 and may also or alternatively use prediction factors such as the content of the video. For example, additional AR effect usage statistics for video scoring can be for particular video content (e.g., where video content is based on video classification, objects or location depicted, video size, encoding, framerate, etc.), such that the system can identify which AR effects users most often select for video with that content.

At block 816, process 800 can determine whether the resource score(s) determined at block 814 is above a cache threshold. In various implementations, the threshold can be a fixed value or can change, e.g., based on remaining cache space. If the score is above the threshold, process 800 can continue to block 819; if not, process 800 can continue to block 818.

At block 818, process 800 can unload (e.g., remove from memory, schedule for garbage collection, etc.) the freed resources with a score below the threshold. At block 819, process 800 can store any freed resources with a score above the threshold in the cache. In some implementations, process 800 can automatically unload any resources that are larger than the total cache size. In some cases, process 800 can also automatically unload any resources that are larger than the available cache size, while in other cases, process 800 can expel resources from cache with the lowest scores, if there are any cached resources with a lower score than the resources scored at block 814, to make room in the cache for the resource.

At block 820, process 800 can determine whether the video has ended. For a pre-recorded video, this can be when the video is fully rendered with selected AR effects. For a live video feed this can be when video capturing ends. If the video has not ended, process 800 can return to block 806. If the video has ended, process 800 can end.

Figure 9:
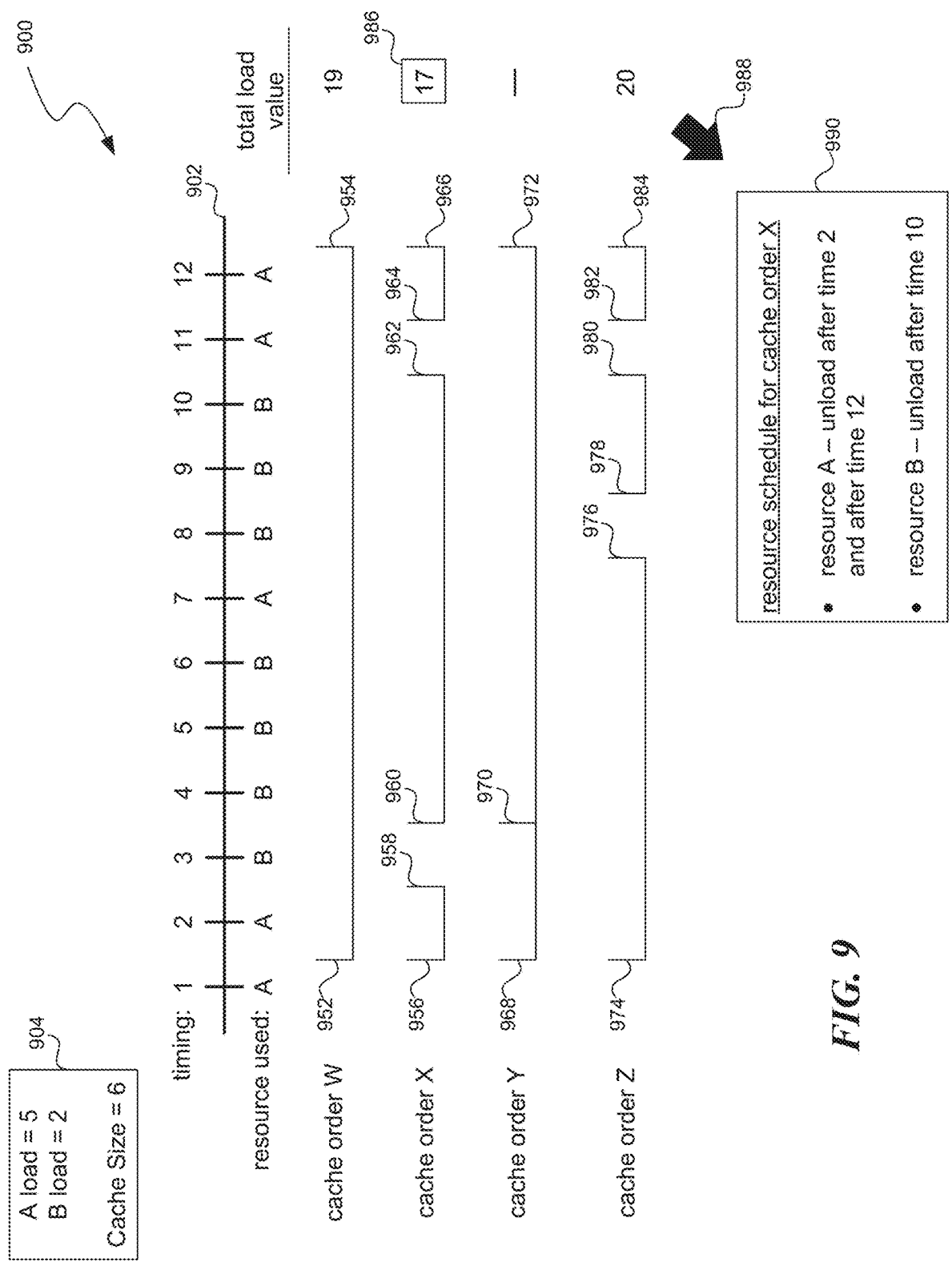
FIG. 9 is a conceptual diagram illustrating an example of selecting a cache order by determining total load values for multiple possible cache orders.

FIG. 9 is a conceptual diagram illustrating example 900 of selecting a cache order by determining total load values for multiple possible cache orders. Example 900 includes a timeline 902 with 12 time intervals, labeled 1-12, with indications of resources A or B used at each time interval. This is a simplified version of a render operation pipeline showing the timing in which resources will be loaded. Example 900 also includes parameters 904 indicating that the load cost for resource A is 5 (based on a size of the resource), the load cost for resource B is 2, and the total cache size is 6.

Four possible cache orders have been defined, cache order W, cache order X, cache order Y, and cache order Z. Cache order W includes a cache 952 of resource A after time 1 and an unload 954 of resource A after time 12. Cache order X includes a cache 956 of resource A after time 1, an unload 958 of resource A after time 2, a cache 960 of resource B after time 3, an unload 962 of resource B after time 10, a cache 964 of resource A after time 11, and an unload 966 of resource A after time 12. Cache order Y includes a cache 968 of resource A after time 1, a cache 970 of resource B after time 3, and an unload 972 of resources A and B after time 12. Cache order Z includes a cache 974 of resource A after time 1, an unload 976 of resource A after time 7, a cache 978 of resource B after time 8, an unload 980 of resource B after time 10, a cache 982 of resource A after time 11, and an unload 988 of resource A after time 12.

A total load value for each cache order can be computed as follows. For cache order W, initial loading of resource A for the operation at time 1 incurs a cost of 5. Each of the remaining operations using resource A (at times 2, 7, 11, and 12 can use cached resource A and this incur no further load cost. Each of the seven operations at times 3-6 and 8-10 use uncached resource B, requiring resource B to be loaded, at a cost of 2, for each of the seven uses, incurring a load cost of 14. Thus, the total load value for cache order W is 5+2+2+2+2+2+2+2=19.

For cache order X, initial loading of resource A for the operation at time 1 incurs a cost of 5 but the operation at time 2 uses the cached version of resource A and incurs no further load cost. The operation at time 3 incurs a load cost of 2 for resource B, but the operations at times 4-6 and 8-10 use the cached version of resource B and incur no further load cost. The loading of resource A for the operation at time 7 incurs a cost of 5 as does the loading of resource A for the operation at time 11. The operation at time 12 uses the cached version of resource A and incurs no further load cost. Thus, the total load value for cache order X is 5+2+5+5=17.

For cache order Y, initial loading of resource A for the operation at time 1 incurs a cost of 5. The loading of resource B for the operation at time 3 incurs a cost of 2. However, the further caching of resource B, while resource A is in the cache, would require a cache size of at least 7 and, in example 900, the total cache size is 6. Thus, cache order Y is eliminated from consideration.

For cache order Z, initial loading of resource A for the operation at time 1 incurs a cost of 5, but the operations at times 2 and 7 use the cached version of resource A and incur no further load cost. The five operations at times 3-6 and 8 each incur a load cost of 2 for resource B. The operations at times 9 and 10 use the cached version of resource B and incur no further load cost. The loading of resource A for the operation at time 11 incurs a cost of 5 but the operation at time 12 uses the cached version of resource A and incurs no further load cost. Thus, the total load value for cache order Z is 5+2+2+2+2+2+5=20.

As indicated by box 986, cache order X has the lowest total load value of 17. As indicated by arrow 988, cache order X is thus selected, specifying resource schedule 990 indicating that resource A should be unloaded after time 2 and after time 12 and resource B should be unloaded after time 10.

Figure 10A:
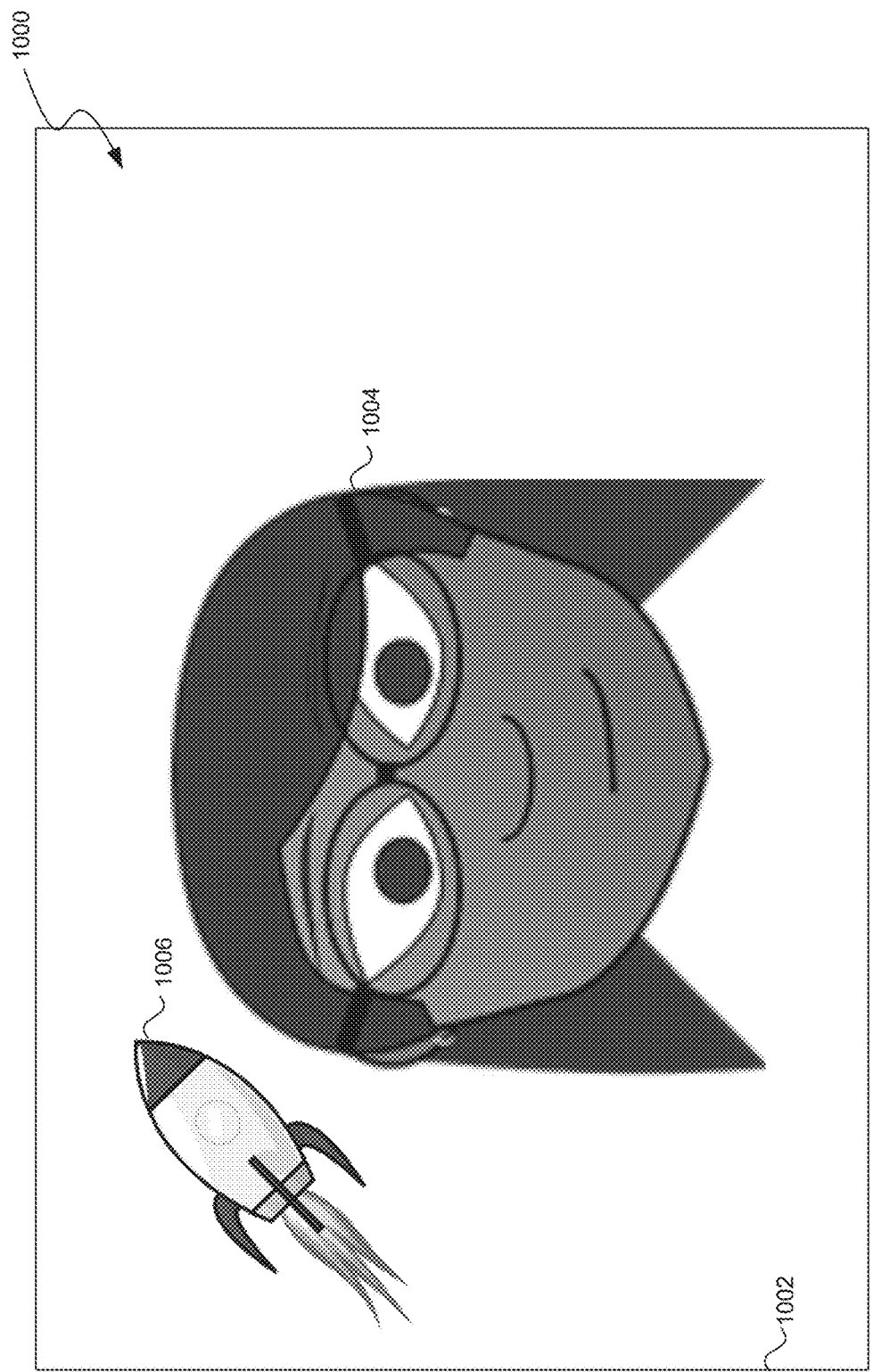
FIGS. 10A-10C are conceptual diagrams illustrating example successive frames of a video rendered to include multiple AR effects.
Figure 10B:
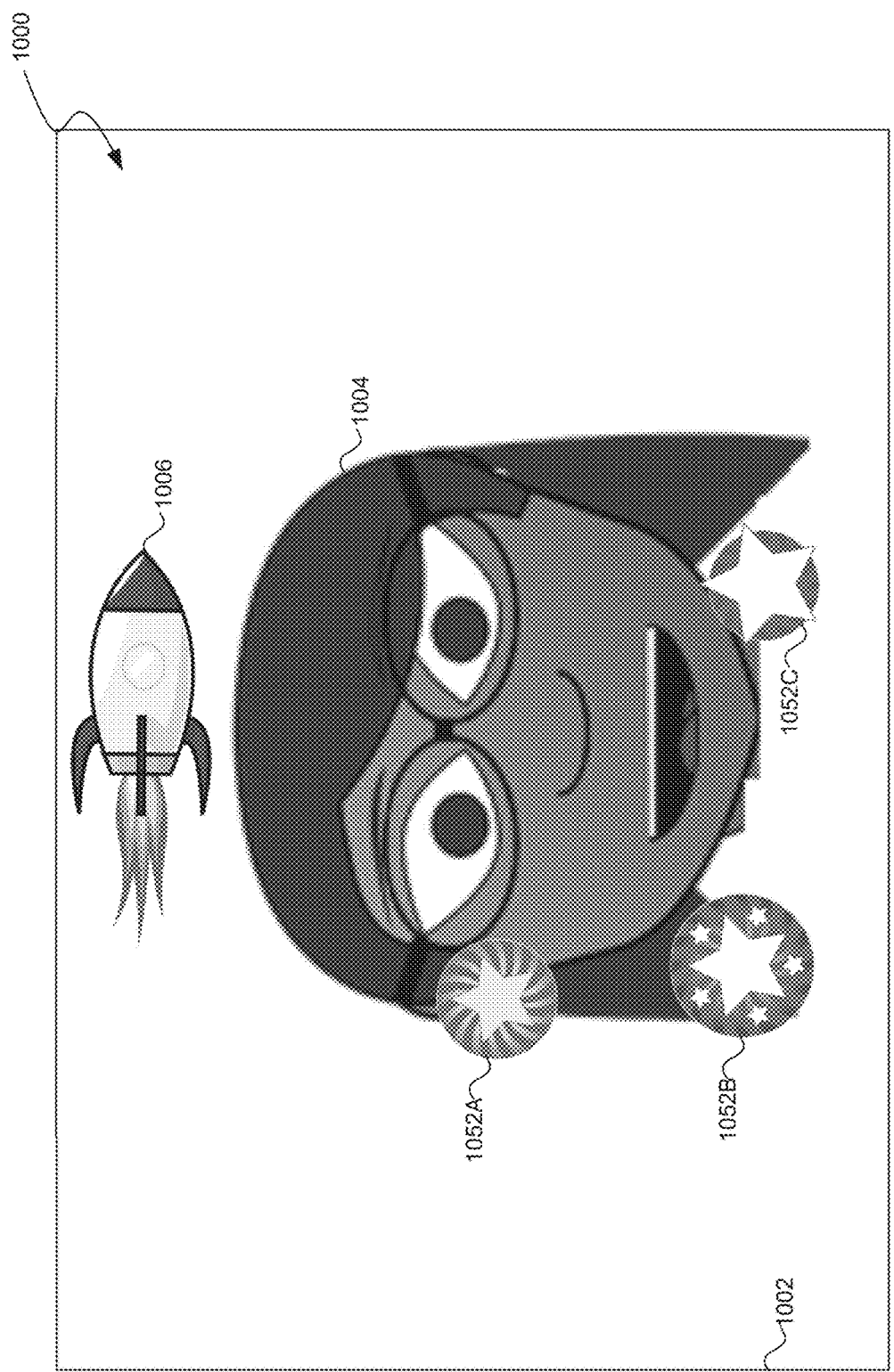
Figure 10C:
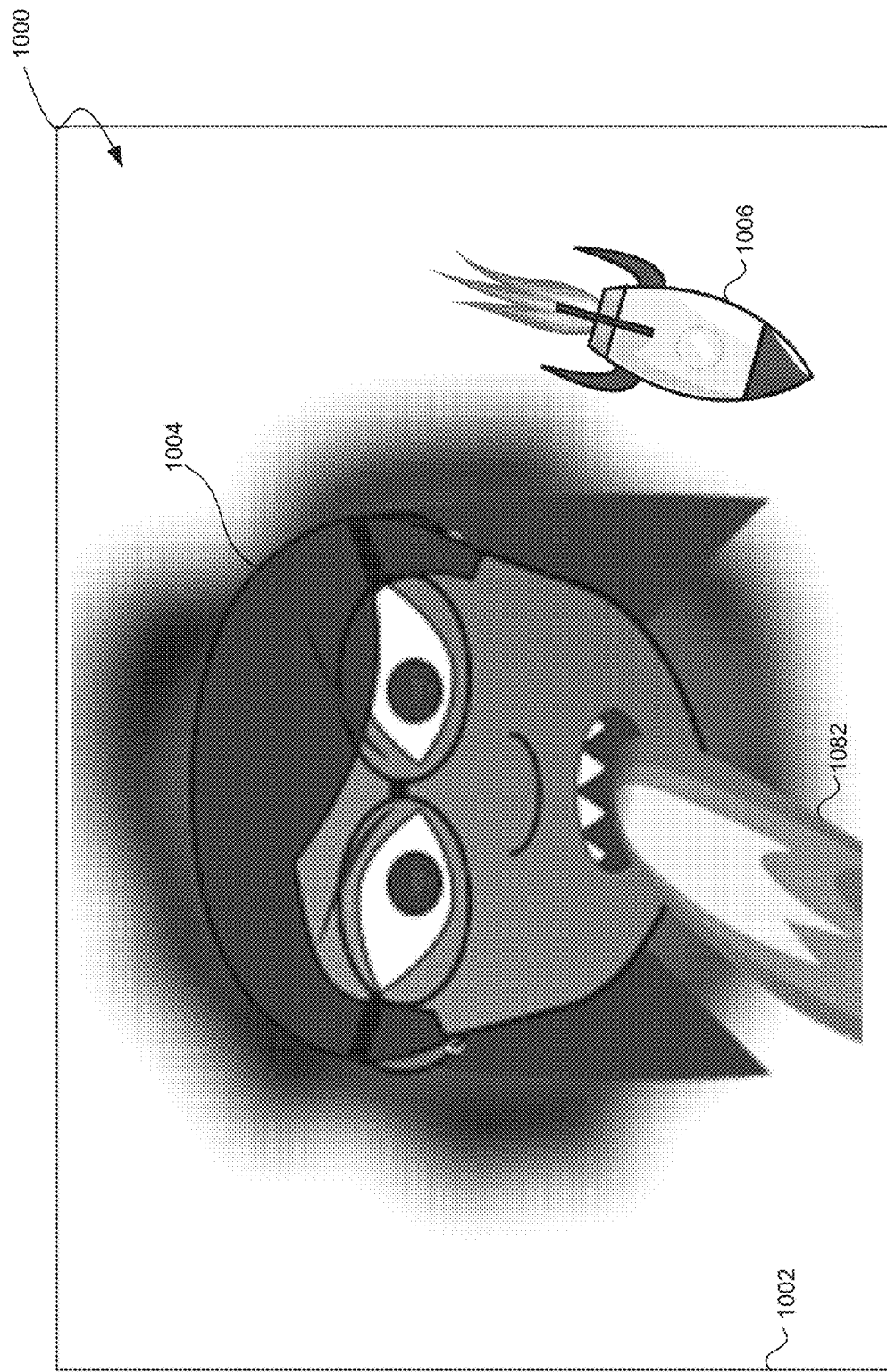

FIGS. 10A-10C are conceptual diagrams illustrating an example 1000 of successive frames of a video rendered to include multiple AR effects. Example 1000 includes a video 1002 depicting a person 1004. Referring to FIGS. 10A-10C together, a user has selected three AR effects to apply to video 1002—a spaceship 1006, stars 1052A-1052C, and a fire effect 1082.

In example 1000, the spaceship 1006 AR effect was selected through a voice command while the user was interacting with an AR selection application, where the spoken command "spaceship" was mapped to adding this AR effect to the video. The spaceship 1006 is configured to, by default, display throughout the entire video. Thus, when the user spoke the "spaceship" command, the spaceship AR effect 1006 was added to the entire video with default length and position implementation parameters, causing spaceship AR effect 1006 to fly around the edge of the video throughout the length of the video.

Stars 1052A-1052C AR effect (FIG. 10B) is selected by the user through a graphical UI in the AR selection application. The stars 1052 AR effect has selectable implementation parameters for triggering when to display, duration of display, and count of stars to display near the depicted person's mouth. In this case, the user has selected implementation parameters specifying that the stars AR effect 1052 should display when the system identifies that the depicted person has smiled, for two seconds, and to display three stars. Thus, when rendering the stars 1052A-1052C AR effect, the system analyzes the video to determine when the depicted person has smiled and sets that time as the AR effect start time and two seconds later as the AR effect end time. When that start time arrives in the rendering process, a rendering engine uses a user model to identify the position of the depicted person's mouth and displays three starts there. The system stores the user model in a cache, according to a resource scheduled determined to minimize load time by reusing the user model for the fire AR effect 1082.

Fire effect 1082 (FIG. 10C—with flames, fake teeth, and a shadowed background) is also selected by the user through the graphical UI in the AR selection application. The fire effect 1082 AR effect has selectable implementation parameters for triggering when to display and duration of display in relation to the depicted person's mouth and head. In this case, the user has selected implementation parameters specifying that the stars AR effect 1052 should display when the system identifies that the depicted person is yelling for 1.5 seconds. Thus, when rendering the fire AR effect 1082, the system analyzes the video to determine when the depicted person has started yelling and sets that time as the AR effect start time and 1.5 seconds later as the AR effect end time. When that start time arrives in the rendering process, a rendering engine uses the cached user model, used by the stars 1052 AR effect to identify the position of the depicted person's mouth and the outline of the depicted persons head and, based on these, displays fire coming out of the depicted person's mount, jagged teeth in the depicted person's mouth, and a shadowed background around the user's head. Upon completing rendering of the fire AR effect 1082, the system determines that the user model has been freed, and based on the resource scheduled, unloads the user model.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being "above a threshold" means that a value for an item under comparison is above a specified other value, that an item under comparison is among a certain specified number of items with the largest value, or that an item under comparison has a value within a specified top percentage value. As used herein, being "below a threshold" means that a value for an item under comparison is below a specified other value, that an item under comparison is among a certain specified number of items with the smallest value, or that an item under comparison has a value within a specified bottom percentage value. As used herein, being "within a threshold" means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for pre-storing resources for augmented reality (AR) effects, the method comprising:
   predictively pre-storing one or more resources for one or more AR effects by:
      generating a prediction of reduced loading time during rendering of one or more AR effects resulting from pre-loading of a set of the one or more resources, wherein the prediction is based on—AR effect statistics of past frequencies of AR effect use, and resource characteristics for resource sizes and/or expected latency in accessing resources; and
      in response to the prediction, adding, to a local cache, the set of one or more resources;
   receiving an indication of a video associated with the one or more AR effects;
   causing one or more frames of the video to be rendered, with the one or more AR effects,
      wherein the rendering with the one or more AR effects uses the pre-loaded set of one or more resources; and
      wherein the rendering using the pre-loaded set of one or more resources is performed more quickly than rendering the one or more AR effects when the set of one or more resources is not available in the local cache;
   determining that at least one particular resource has been freed;
   determining, based on a resource schedule, that the freed resource should be unloaded; and
   in response, unloading the freed resource from the local cache.

2. The method of claim 1, wherein at least some of the AR effect statistics are identified as being specific to a context corresponding to a current situation, the context identifying one or more of: user characteristics, a location, identified content of the video, or any combination thereof.

3. The method of claim 1, wherein at least some of the AR effect statistics are identified as being specific to a current user, signifying:
   which AR effects the current user uses most often; and/or
   in what context the current user selects AR effects.

4. The method of claim 1, wherein at least some of the AR effect statistics are identified as being specific to a current location, signifying AR effects most often selected for video captured at the current location.

5. The method of claim 1, wherein the generating the prediction of reduced loading time is based on processing by a machine learning model trained to predict which AR effects a user will select based on at least the AR effect statistics of past frequencies of AR effect use, user demographics, and location data.

6. The method of claim 1, wherein the generating the prediction of reduced loading time is based on processing by a machine learning model trained to predict which AR effects a user will select based on at least the AR effect statistics of past frequencies of AR effect use.

7. The method of claim 1, wherein the predictively pre-storing the one or more resources further includes determining that one or more conditions, for storing the one or more resources in the local cache, was evaluated by making a comparison of a) a resource score, computed for the one or more resources, with b) a cache threshold; wherein the resource score is based on the AR effect statistics of past frequencies of AR effect use.

8. The method of claim 1, wherein the one or more frames of the video is to be rendered with an AR effect, of the one or more AR effects, as a result of one or more voice commands from a user, wherein receiving the one or more voice commands comprised:
   identifying a spoken activation phrase;
   receiving a particular voice command;
   selecting, using a pre-established mapping of commands to AR effects, the AR effect by mapping a version of the received particular voice command to the AR effect; and
   providing an indication of the selected AR effect.

9. The method of claim 1, wherein the local cache is in RAM or flash storage.

10. The method of claim 1, wherein the prediction is further based on determined content of the video and an identification of AR effects most often selected for video with that content.

11. A computer-readable storage medium storing instructions that, when executed by a computing system, cause the computing system to perform a process for pre-storing resources for augmented reality (AR) effects, the process comprising:
receiving an indication of a first video associated with one or more AR effects;
causing one or more first frames of the first video to be rendered, wherein the rendering uses one or more resources for the one or more AR effects;
generating a resource score for the one or more resources, wherein the resource score is based on:
AR effect statistics of past frequencies of AR effect use, and/or
determined content of the first video and an identification of AR effects most often selected for videos with the determined content;
determining that the resource score for the one or more resources is above a threshold and, in response, locally storing the one or more resources; and
causing one or more second frames of the first video and/or one or more frames of a second video to be rendered using the locally stored one or more resources, wherein the rendering is configured to retrieve the one or more resources from a remote source when the one or more resources are not available locally.

12. The computer-readable storage medium of claim 11, wherein the resource score is based on the AR effect statistics of past frequencies of AR effect use through a comparison of (a) a total expected load time savings by caching the one or more resources with (b) an expected cost of caching the one or more resources.

13. The computer-readable storage medium of claim 12, wherein the total expected load time savings is be based on an estimated cost of reloading the one or more resources and an estimated frequency of further use of the one or more resources in further rendering.

14. The computer-readable storage medium of claim 13, wherein the estimated frequency of further use of the one or more resources is based on determined video content and statistics for which AR effects are most often selected for that content.

15. The computer-readable storage medium of claim 11, wherein the determined content of the first video is based on determinations of one or more of: identified objects or locations depicted, a video size, a video encoding, a video framerate, or any combination thereof.

16. The computer-readable storage medium of claim 11, wherein the threshold is a dynamic value that changes based on remaining space in a cache.

17. A computing system for pre-storing resources for augmented reality (AR) effects, the computing system comprising:
one or more processors; and
one or more memories storing instructions that, when executed by the one or more processors, cause the computing system to perform a process comprising:
predictively pre-storing one or more resources for one or more AR effects by:
generating a prediction of reduced loading time during rendering of one or more AR effects resulting from pre-loading of a set of the one or more resources; and
in response to the prediction, adding, to a local cache, the set of one or more resources;
receiving an indication of a video associated with the one or more AR effects;
causing one or more frames of the video to be rendered, with the one or more AR effects,
wherein the rendering with the one or more AR effects uses the pre-loaded set of one or more resources;
determining that at least one particular resource has been freed;
determining, based on a resource schedule, that the freed resource should be unloaded; and
in response, unloading the freed resource.

18. The computing system of claim 17, wherein the prediction is based on A) AR effect statistics of past frequencies of AR effect use, and/or B) resource characteristics for resource sizes and/or expected latency in accessing resources.

19. The computing system of claim 17, wherein the rendering using the pre-loaded set of one or more resources is performed more quickly than rendering the one or more AR effects when the set of one or more resources is not available in the local cache.

* * * * *